United States Patent [19]

Pruett et al.

[11] 4,391,423
[45] Jul. 5, 1983

[54] SATELLITE RETRIEVAL SYSTEM

[75] Inventors: Edwin C. Pruett; Kem B. Robertson; Tomas E. Loughead, all of Huntsville, Ala.

[73] Assignee: The United States of America as represented by the Administrator of the National Aeronautics and Space Administration, Washington, D.C.

[21] Appl. No.: 248,745

[22] Filed: Mar. 30, 1981

[51] Int. Cl.³ .............................................. B64G 1/64
[52] U.S. Cl. .................................... 244/161; 244/115; 269/152; 269/242; 269/244; 294/86 R
[58] Field of Search ..................... 244/137 R, 115, 116, 244/161; 294/86 R, 67 BB; 269/152, 155, 244, 242, 111, 115

[56] References Cited

U.S. PATENT DOCUMENTS

| | | | |
|---|---|---|---|
| 3,552,688 | 1/1971 | Baekken | 244/115 |
| 3,790,121 | 2/1974 | Sels et al. | 269/115 |
| 3,868,139 | 2/1975 | Drelicharz | 294/67 BB |
| 4,105,241 | 8/1978 | Mee | 244/161 |
| 4,123,020 | 10/1978 | Korsak | 244/116 |
| 4,173,324 | 11/1979 | Rudmann | 244/161 |
| 4,177,964 | 12/1979 | Hujsak | 244/161 |

FOREIGN PATENT DOCUMENTS

| | | | |
|---|---|---|---|
| 127955 | of 1950 | Sweden | 269/111 |
| 409590 | of 1934 | United Kingdom | 269/114 |

Primary Examiner—Galen L. Barefoot
Attorney, Agent, or Firm—J. H. Beumer; J. R. Manning; L. D. Wofford, Jr.

[57] ABSTRACT

A satellite retrieval system (10) wherein first and second pairs of coacting parallel bars (40), and (94) are separately mounted in spaced parallel planes on the front of a spacecraft (14). The bars of one pair are at right angles to bars of the other pair, and together the two pairs of bars effect a variable aperture adapted to close around a rod (26) extending from a second spacecraft (22) to thereby effect the capture of the latter.

5 Claims, 5 Drawing Figures

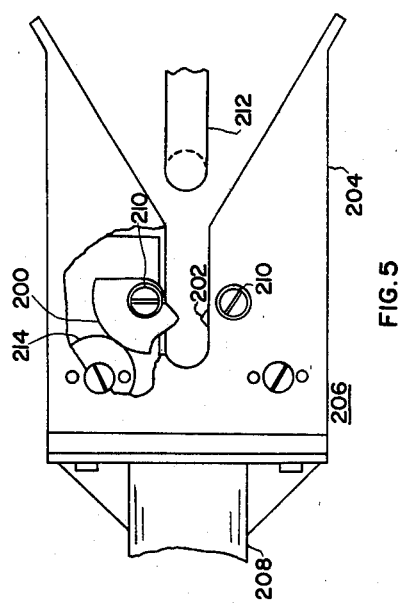
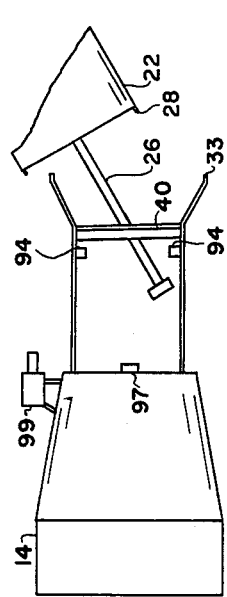
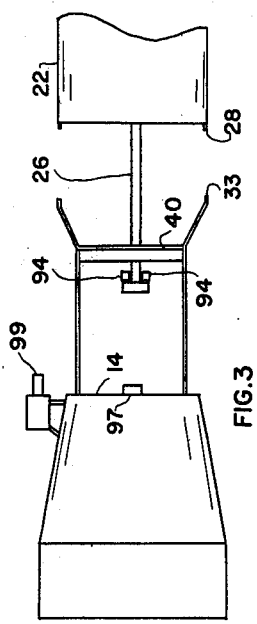
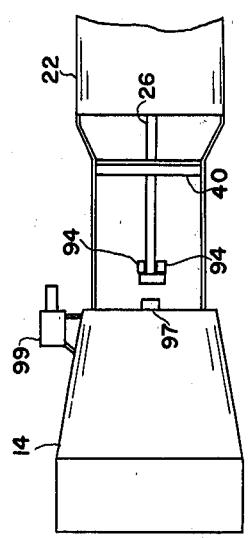

4,391,423

SATELLITE RETRIEVAL SYSTEM

ORIGIN OF THE INVENTION

The invention described herein was made in the performance of work under a NASA contract and is subject to the provisions of Section 305 of the National Aeronautics and Space Act of 1958, public law 85-568 (74 STAT 453; 42 U.S.C. 2457).

TECHNICAL FIELD

This invention relates generally to devices and systems for coupling space vehicles, and particularly to a grappling system borne by one spacecraft for securing it to another.

BACKGROUND ART

With the advent of the space age, and with increased numbers of space vehicles operating, it is only logical that there be occasions when it is desirable to effect docking between them. A variety of devices and systems have been proposed for this purpose, and reference is particularly made to U.S. Pat. Nos. 3,254,863; 3,508,723; 3,910,533; 4,018,409; and 4,117,964.

These patents illustrate a variety of techniques and in general employ variously configured mating units carried by the vehicles to be joined. These appear to require fairly close dimensioned contact, and this in turn requires a fairly precise maneuver by one or both of the vehicles. This can present a problem inasmuch as if there is an initial non-aligned contact which does not result in a joinder, this contact may result in an impact transmitted by one vehicle to another which can produce an undesired rotation, possibly tumbling, of one of the vehicles. This must then be corrected before docking can be finally accomplished, which, of course, adds to the complexity and time required for docking.

It is the object of this invention to provide an improved docking or retrieval system wherein docking components of the vehicle effecting retrieval surround the docking component of the vehicle to be retrieved by a significant clearance prior to any mechanical contact, and thereby a contacting maneuver is relatively assured which will result in successful capture.

DISCLOSURE OF THE INVENTION

In accordance with this invention, a vehicle which is to be retrieved would be equipped with a simple rectangular rod which has at an outer end an enlarged region or knob. The retrieving vehicle has mounted on it a retrieval fixture which consists of two pairs of orthogonally arranged grappling bars, a front pair and a rear pair. With the retrieving vehicle maneuvered wherein the two pairs of bars surround, but do not touch, the rectangular retrieval rod on the vehicle to be retrieved, the front bars are operated to close on the rod to a loose fit. Then, the orthogonally arranged rear bars are operated to close to make a rigid or hard contact with the rod. This forces the two vehicles into axial alignment, and thereafter the vehicles are drawn to a position where interengaging latches operate to finally and firmly couple the vehicles.

BRIEF DESCRIPTION OF THE DRAWINGS

FIGS. 2-4 are diagrammatic illustrations of the retrieval system and illustrating certain additional elements of it.

FIG. 5 is a pictorial illustration of a detail of the latch mechanisms finally connecting the retrieving vehicle with the retrieved vehicle.

BEST MODE FOR CARRYING OUT THE INVENTION

Figure 1:
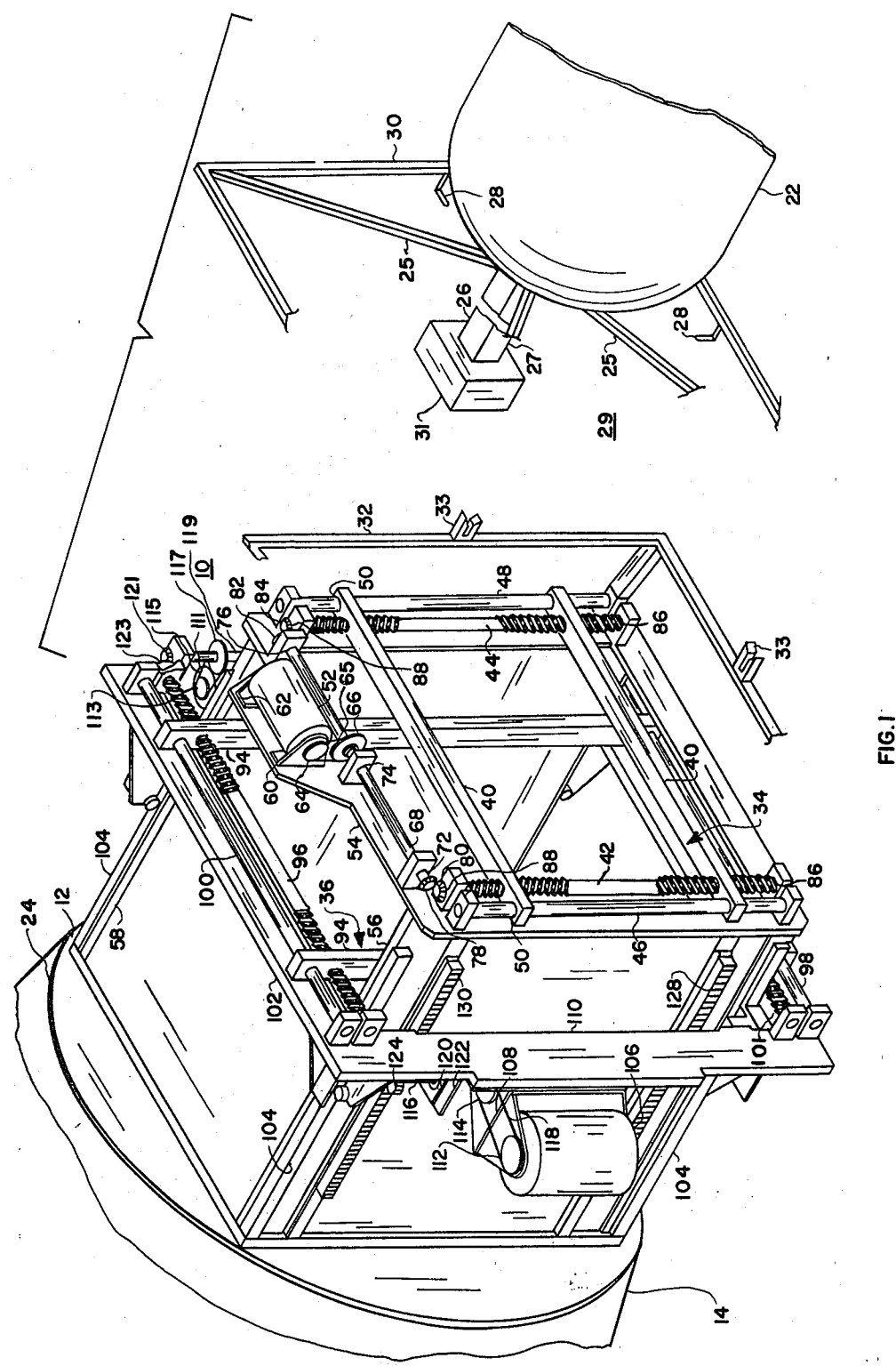
FIG. 1 is an exploded pictorial view illustrative of the principal elements of the system of this invention.

Referring to FIG. 1, a satellite retrieval assembly 10 is mounted to the front end 12 of a space vehicle 14 which is to function as a retrieval vehicle. Assembly 10 is supported on vehicle 14 via an aft support plate 24 by conventional attachment means (not shown).

A vehicle to be retrieved or captured, as illustrated by vehicle 22, would include a relatively simple docking interface 29 consisting of rod fixture 26 and catches 28 on guide member 30, supported on satellite vehicle 22 by supports 25. Rod fixture 26 consists of a rectangular rod 27 having an enlarged rectangular knob 31 at its outer end.

Satellite retrieval assembly 10 on space vehicle 14 provides three basic elements: forward guide member 32, which mounts solenoid operated receptacle latch 33, which mates with coordinately shaped catches 28 on guide 30 of vehicle 22; a forward capture bar assembly 34, and aft capture bar assembly 36. In addition to mounting receptacle 33, forward guide member 32 is conveniently observable by TV cameras 97 and 99 (FIGS. 2-4), and when viewed with respect to guide 30 of target vehicle 22, the maneuvering of vehicle 14 into a docking posture with target vehicle 22 is facilitated. Capture is effected by a combination of forward capture bar assembly 34 and aft capture bar assembly 36 positioned in this order behind guide member 32.

Forward capture bar assembly 34 employs a pair of parallel horizontal capture bars 40, and these are driven toward and away from each other by threadable engagement with drive screws 42 and 44. Their orientation is assisted by spaced guide shafts 46 and 48 which extending through openings 50 of the capture bars. A motor 52 is mounted on front mounting plate 54 (in turn mounted on frame members 56 and 58) by brackets 60 and 62. A sprocket 64 on motor 52 drives a chain 65, which in turn drives sprocket 66 attached to shaft 68 supported on plate 54 by bearings 72, 74, and 76. The sprocket and drive chain are diagrammatically illustrated. Bevel gear 78 on shaft 68 drives bevel gear 80 mounted to drive screw 42, and bevel gear 82 on shaft 68 drives bevel gear 84 mounted to drive screw 44. Drive screws 42 and 44 are supported by bearings 86 and 88, which in turn are conventionally mounted to plate 54 (by means not shown). The screw threads on drive screws 42 and 44 and corresponding internal threads on capture bars 40 are selected so that the two capture bars move in the opposite direction as drive screws 42 and 44 are rotated by motor 52.

Aft capture bar assembly 36 is positioned behind forward capture bar assembly 34 and is arranged with its parallel capture bars 94 are right angles to those of forward capture bar assembly 34. Capture bars 94 are mounted and driven by oppositely positioned screw drives 96 and 101, with the screw drives supported by guides 98 and 100 mounted in the same manner as guides 46 and 48 of front capture bar assembly 34. Drive screws 96 and 101 and guide shafts 98 and 100 of aft capture bar assembly 36 are movably supported on a guide frame 102, and it is slidably supported on guides 104 which maintain the plane of plate 102 vertical and thus normal to the axis of vehicle 14 while it is movable along this axis to effect a retraction or extension of aft capture bar assembly 36 with respect to vehicle 22. Guides 104 are rigidly supported on support plate 24. A motor 111 is attached with brackets (not shown) to frame 102, and it drives a sprocket 113 and chain 115, which in turn drive sprocket 117 connected to shaft 119. Bevel gear 121 on shaft 119 drives bevel gear 123 connected to drive screw 96. Retraction and extension is powered by motor 106 mounted by bracket 108 on frame 102. A sprocket 112 of motor 106 drives a sprocket 114 on shaft 116 by means of a chain 118, the sprocket and chain being diagrammatically illustrated. Drive shaft 116 is supported by brackets 120 and 122 on frame 102, and pinions 124 (one shown) mounted on shaft 116 mesh with racks 128 and 130, which are fixed mounted to frame 56, in turn attached to vehicle 14. Depending upon the direction of operation effected by motor 106, pinion gears 124 drive frame 102 and thus aft capture bar assembly 36 in a retract (left) or extend (right) direction.

Limit switches may be employed with all of the drive systems described to turn off a given motor when capture bars or frame members 102 have reached a selected limit.

FIG. 5 illustrates in detail the latch-catch combination employed to effect a final hard dock between chase vehicle 14 and target vehicle 22. Two identical latch cam members 200 and 202 are mounted in a body member 204 of a latch 206 supported on frame 208. Each latch cam member is pivotally mounted on shaft 210, and each is biased in the position shown by a spring (not shown). In this latch position, catch 212 is firmly held in place by the cam members. Release of catch 212 is accomplished by means of rotary solenoid 214 coupled to each of the latch cam members, and when energized, the rotary solenoid rotates a latch cam member in a direction which would raise the cam members out of engagement with catch 212.

To examine operation of the retrieval system, assume that capture bar assemblies 34 and 36 are operated to their maximum extended position (FIG. 2), and thus the aperture of the retrieval system is at a maximum. Assume further that the retraction frame 102 is operated to cause frame 102 to move to its maximum extended position wherein frame 102 would be at its maximum position to the right (as illustrated in FIG. 1). Target vehicle 22 would then be observed via television cameras 97 and 99, and vehicle 14 would be maneuvered toward target vehicle 22 and along a course which enables rod fixtue 26 of target vehicle 22 to be encompassed by retrieval assembly 10 as, for example, diagrammatically illustrated in FIG. 2. It will thus be seen in FIG. 2 that there need not be close axial alignment between the vehicles. With rod fixture 26 as shown in FIG. 2, forward capture bars 40 are operated together to centrally capture rod fixture 26, essentially along a vertical plane passing through the longitudinal axis of vehicle 22. Typically, this operation would be such as to effect a relatively loose contact between capture bars 40 and rod fixture 26.

Next, and this is illustrated in FIG. 3, aft capture bars 94 are operated via motor 111 to be drawn toward rod fixture 26, and in this instance, bars 94 press tightly against rod fixture 26, and by virtue of the planar nature of the rectangular surfaces of rod 26 and bars 94, this causes vehicle 22 to be moved to the axial alignment position of the vehicle shown in FIG. 3. Thus, at this point, the vehicles are brought to axial alignment wherein receptacle latch 33 and catches 28 are directionally aligned. Next, and finally, motor 106 is operated to effect a retraction of frame 102, and thus aft capture bars 94 are moved to a position as shown in FIG. 4, and wherein latch catches 28 on vehicle 22 are drawn into and locked to a position by and within receptacle latch 33 to thus complete the docking, and wherein there is a firm hard dock connection between the vehicles.

From the foregoing, it will be appreciated that a basically simple but very effective docking system is realized. Relatively standard mechanisms are employed in the retrieval assembly on the chase vehicle, and likewise for the target vehicle. The initial proximity maneuver between vehicles need not be in terms of axial alignment of the vehicle, and considerable latitude of the approach is possible. Once the docking rod of the target vehicle is within the retrieval assembly, and thus encompassed by the capture bars, capture by the bars is certain, and thus the problem of non-aligned initial contact contributing to a tumbling maneuver on the part of one of the vehicles with respect to the other is eliminated.

We claim:

1. A satellite retrieval system for employment with a spacecraft comprising:
    a cubical first frame adapted to be fixedly attached to a spacecraft;
    a rectangular second frame positioned around said cubical first frame and including support means for movably supporting said second frame on said cubical first frame;
    a first pair of parallel bars movably mounted on said cubical first frame for balanced relative movement with respect to a center line through said cubical first frame and normal to a plane of said second frame, being movable across said first frame;
    a second pair of parallel bars, orthogonal to said first pair of parallel bars, movably mounted on said second frame for balanced relative movement with respect to said center line, and positioned within said cubical first frame;
    first operating means for selectively moving bars of said first pair of parallel bars toward and away from each other;
    second operating means for selectively moving bars of said second pair of parallel bars toward and away from each other; and
    retracting means including drive means coupled between said cubical first frame and said second frame for selectively moving said second frame along said center line and between extended and retracted positions.

2. A retrieval system as set forth in claim 1 including a first pair of spaced threaded rods mounted on said cubical frame, in turn threadably supporting said first pair of parallel bars, and said first operating means comprises means for rotating said threaded rods and relatively moving said last-named parallel bars.

3. A retrieval system as set forth in claim 2 including a second pair of spaced threaded rods rotatably supported on said second frame and threadably supporting said second pair of parallel bars, and said second operating means includes means for rotating said second pair of threaded rods and effecting the relative movement of said second pair of parallel bars.

4. A retrieval system as set forth in claim 3 including:
a rod attachable on one end to a satellite to be retrieved, said rod having an enlarged region at an end opposite to said one end, whereby with said retraction means on said spacecraft in an extended position, and said bars of said pairs of bars relatively spaced apart, the spacecraft would be maneuvered until a portion of said rod and said enlarged end region of said rod extend through said parallel bars;

said first operating means is operated to cause said first parallel bars to approach each other to loosely grip said rod, and thereby effecting an initial, soft, attachment between the spacecraft and satellite;

then said second operating means would be operated to cause said second pair of parallel bars to move toward each other and effect a firm engagement between said spacecraft and said rod, and thereby the satellite; and finally said retraction means would be operated to a retract position and thereby draw in said second frame and satellite to a selected docking position.

5. A retrieval system as set forth in claim 4 further comprising:
a third frame mounted on and spaced parallel with said cubical frame;
a fourth frame supportable on said satellite and generally conforming to said third frame; and
latch means comprising:
first latch elements supported by said third frame, and
second latch elements supported on said fourth frame and adapted to mate with said first latch element for finally making a firm latch connection between a said space vehicle and satellite.

* * * * *